(12) United States Patent
Fitzpatrick

(10) Patent No.: US 10,632,868 B2
(45) Date of Patent: Apr. 28, 2020

(54) LIFT UNIT FOR A VEHICLE SEAT

(71) Applicant: Faurecia Automotive Seating, LLC, Auburn Hills, MI (US)

(72) Inventor: Robert C. Fitzpatrick, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/044,613

(22) Filed: Jul. 25, 2018

(65) Prior Publication Data
US 2019/0031050 A1 Jan. 31, 2019

Related U.S. Application Data

(60) Provisional application No. 62/537,203, filed on Jul. 26, 2017.

(51) Int. Cl.
*B60N 2/10* (2006.01)
*A61G 5/14* (2006.01)
*B60N 2/04* (2006.01)
*B60N 2/005* (2006.01)
*B60N 2/24* (2006.01)

(52) U.S. Cl.
CPC ............... *B60N 2/10* (2013.01); *A61G 5/14* (2013.01); *B60N 2/045* (2013.01); *B60N 2/005* (2013.01); *B60N 2/24* (2013.01)

(58) Field of Classification Search
CPC .......... B60N 2/10; B60N 2/045; B60N 2/005; B60N 2/24; A61G 5/14

USPC ......................................................... 297/325
See application file for complete search history.

(56) References Cited

U.S. PATENT DOCUMENTS

| | | | |
|---|---|---|---|
| 4,993,777 A | 2/1991 | Lapointe | |
| 5,136,889 A * | 8/1992 | Hill | B60N 2/0232 297/330 |
| 5,312,153 A * | 5/1994 | Lin | A47C 1/0345 297/68 |
| 5,346,280 A * | 9/1994 | Deumite | A61G 5/14 180/907 |
| 5,803,545 A * | 9/1998 | Guguin | A61G 5/14 297/316 |
| 6,250,717 B1 | 6/2001 | Porcheron | |
| 6,578,854 B2 | 6/2003 | Wucherpfennig | |
| 6,851,751 B1 * | 2/2005 | Romero | A61G 5/14 280/250.1 |
| 8,398,171 B2 * | 3/2013 | Lin | A61G 5/14 297/330 |
| 9,173,792 B2 * | 11/2015 | Goffer | A61G 5/12 |
| 9,375,372 B2 * | 6/2016 | Hunziker | A61G 5/14 |
| 9,775,753 B2 * | 10/2017 | Johnson | A61G 3/063 |
| 9,775,757 B1 * | 10/2017 | Borgman | A47C 23/002 |
| 10,117,797 B2 * | 11/2018 | Davies | A47C 1/029 |
| 2018/0161223 A1 * | 6/2018 | Murphy | A47C 1/0242 |

FOREIGN PATENT DOCUMENTS

SE 9902382 12/2003

* cited by examiner

*Primary Examiner* — Mark R Wendell
(74) *Attorney, Agent, or Firm* — Barnes & Thornburg LLP

(57) ABSTRACT

An occupant support includes a vehicle seat. The vehicle seat includes a seat bottom and a seat back coupled to the seat bottom. The occupant support further includes a lift system coupled to the seat bottom and seat back.

18 Claims, 4 Drawing Sheets

LIFT UNIT FOR A VEHICLE SEAT

PRIORITY CLAIM

This application claims priority under 35 U.S.C. § 119(e) to U.S. Provisional Application Ser. No. 62/537,203, filed Jul. 26, 2017, which is expressly incorporated by reference herein.

BACKGROUND

The present disclosure relates to an occupant support, and particularly to an occupant support including a seat bottom and a seat back. More particularly, the present disclosure relates to a lift system coupled to the seat bottom and the seat back.

SUMMARY

According to the present disclosure, an occupant support includes a vehicle seat. The vehicle seat includes a seat bottom and a seat back coupled to the seat bottom. The occupant support further includes a lift system coupled to the seat bottom and seat back.

In illustrative embodiments, the occupant support includes a lift system configured to change between a seat mode and a lift mode in response to an input. In the seat mode, the seat bottom is in a generally horizontal position and the seat back is arranged to extend upwardly away from the seat bottom and the seat bottom and seat back cooperate to support an occupant sitting on the vehicle seat. In the lift mode, the seat bottom moves to an inclined position to aid an occupant when the occupant is entering or existing the vehicle seat.

In illustrative embodiments, the lift system includes a power supply coupled to the vehicle seat, a control unit coupled to the power supply and configured to provide a command in response to the input, and a lift mechanism coupled to the control unit and the power supply to receive power selectively from the power supply in response to the command from the control unit. The lift mechanism is coupled to the seat bottom and configured to move the seat bottom between the generally horizontal position and the inclined position.

In illustrative embodiments, the lift mechanism includes a base, a lift unit, and a lift pivot. The lift unit is arranged to extend between and interconnect the seat bottom and the base and configured to move between a retracted configuration when the lift system is in the seat mode and an extended configuration when the lift system in in the lift mode. The lift pivot is arranged to extend between and interconnect the base and the seat bottom to cause the seat bottom to rotate about a pivot axis when the lift unit moves between the retracted and extended configurations.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 6:
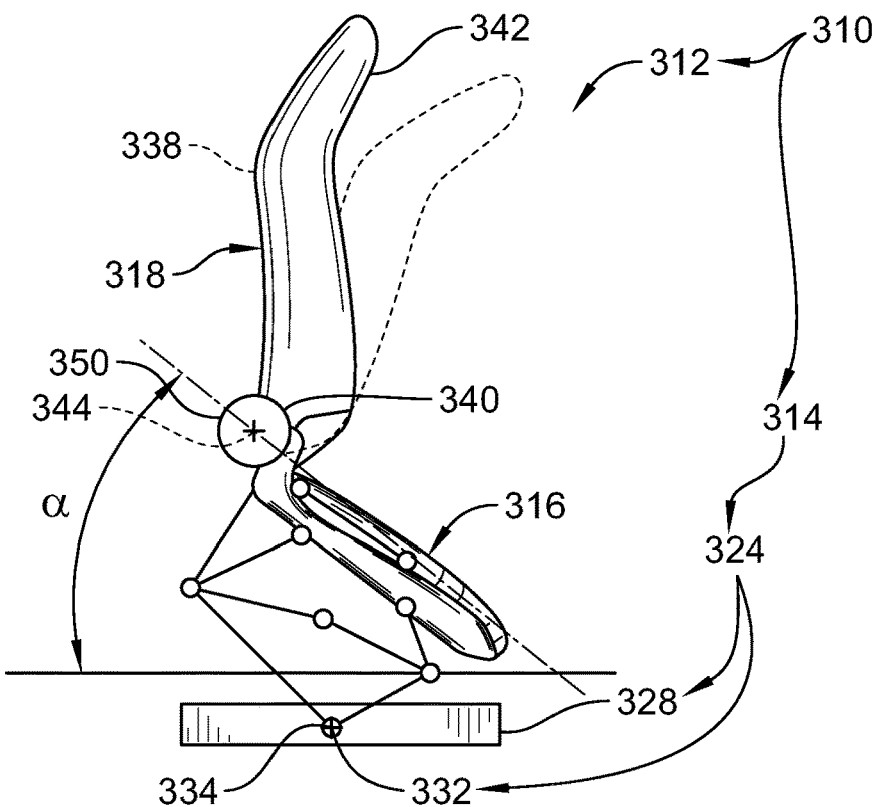
Figure 7:
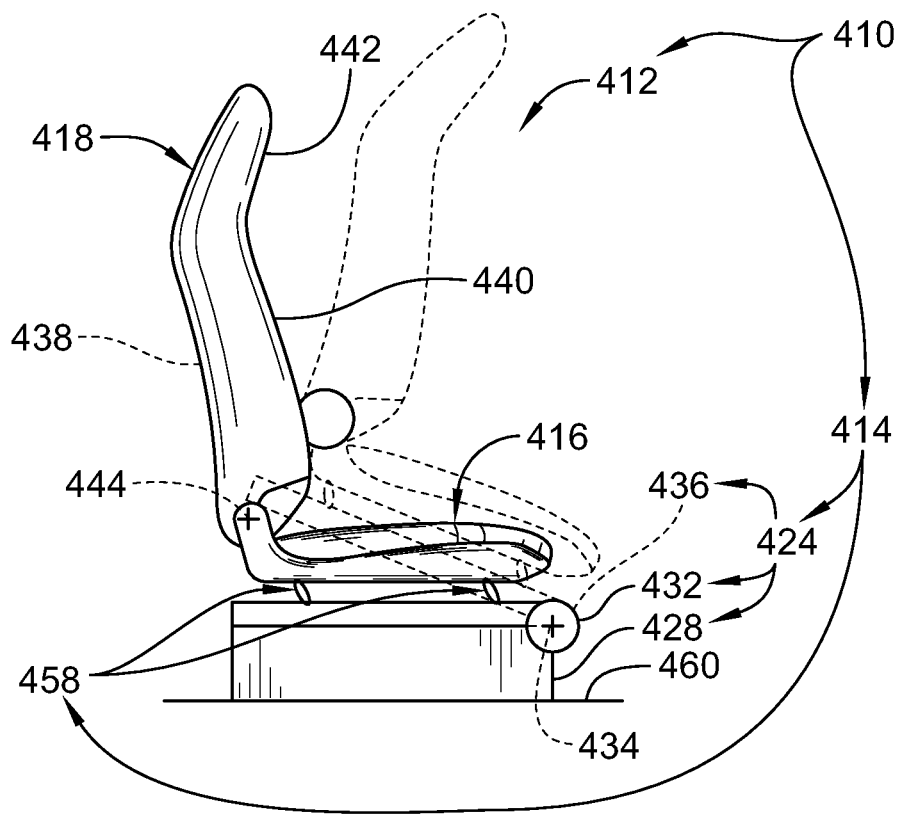

FIG. 6 is an elevation view of a fourth embodiment of an occupant support showing that the occupant support includes a seat back, a seat bottom, and a lift system coupled to the seat bottom and seat back and configured to change between a seat mode and a lift mode; and FIG. 7 is an elevation view of a fifth embodiment of an occupant support showing that the occupant support includes a seat back, a seat bottom, and a lift system coupled to the seat bottom and seat back and configured to change between a seat mode and a lift mode;

DETAILED DESCRIPTION

Figure 1:
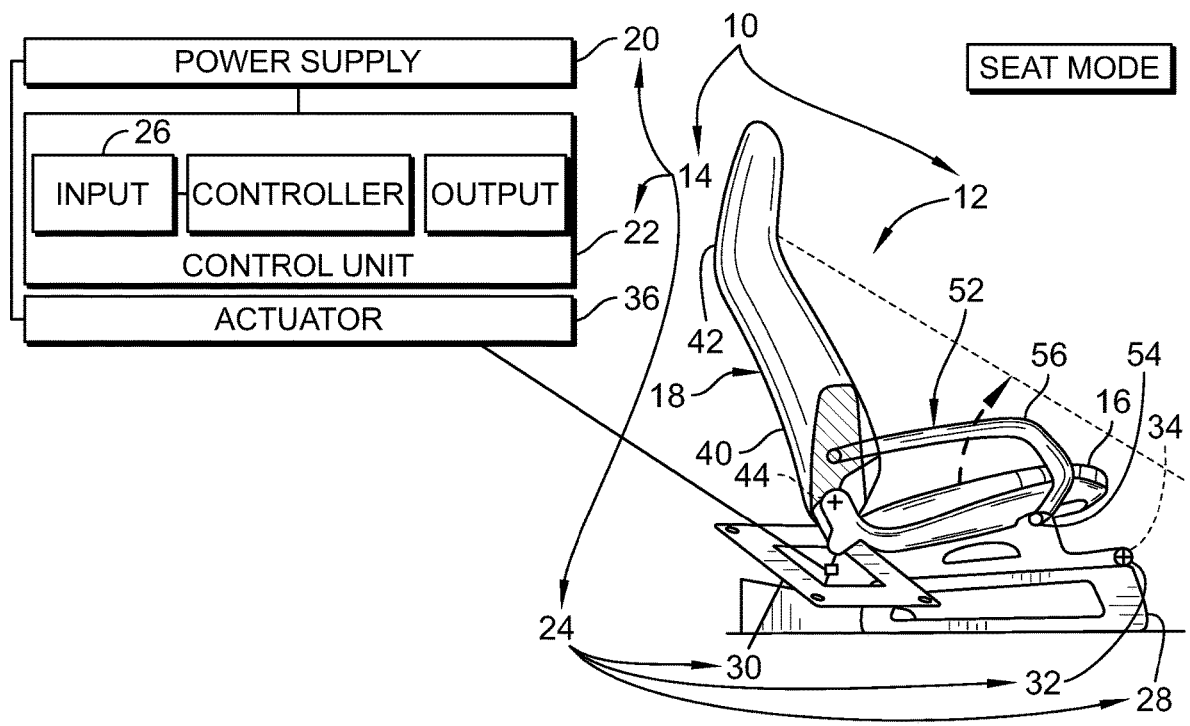
FIG. 1 is a diagrammatic and elevation view of an occupant support in accordance with the present disclosure showing that the occupant support includes a seat back, a seat bottom, and a lift system coupled to the seat bottom and the seat back and configured to change between and a seat mode as shown in FIG. 1 and a lift mode as suggested in FIG. 2.
Figure 2:
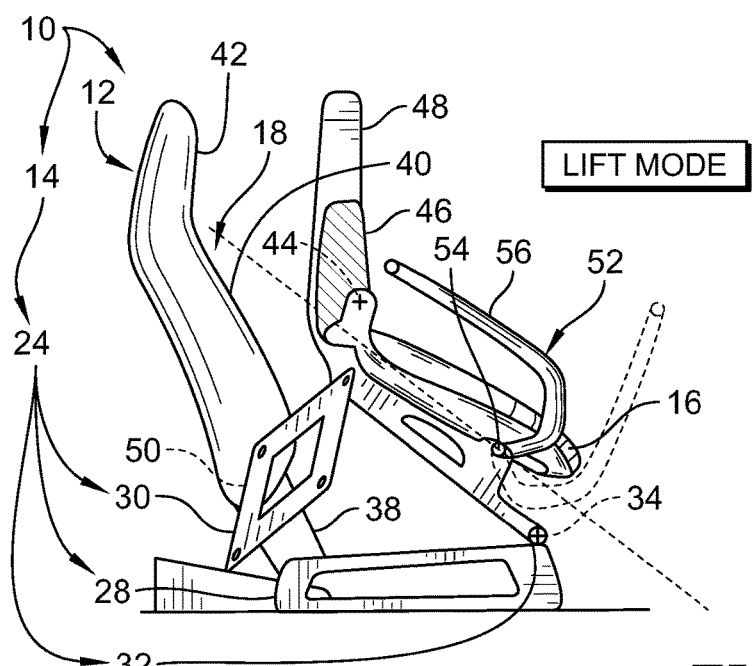
FIG. 2 is a view similar to FIG. 1 showing the lift system changed to the lift mode.
Figure 3:
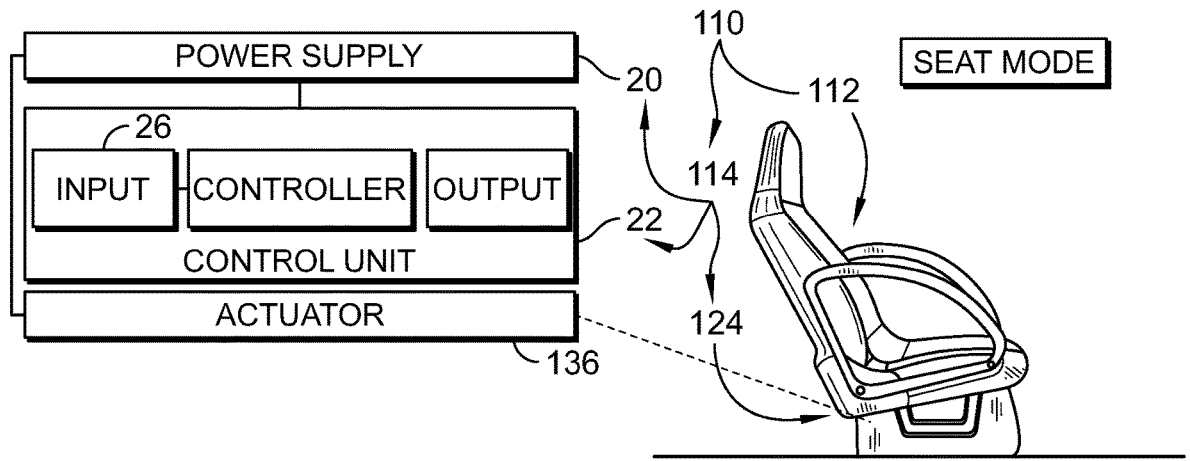
FIG. 3 is a diagrammatic and elevation view of a second embodiment of an occupant support showing that the occupant support includes a seat bottom, a seat back coupled to the seat bottom, and a lift system coupled to the seat bottom and the seat back and configured to change between and seat mode and a lift mode as suggested in FIG. 4.
Figure 4:
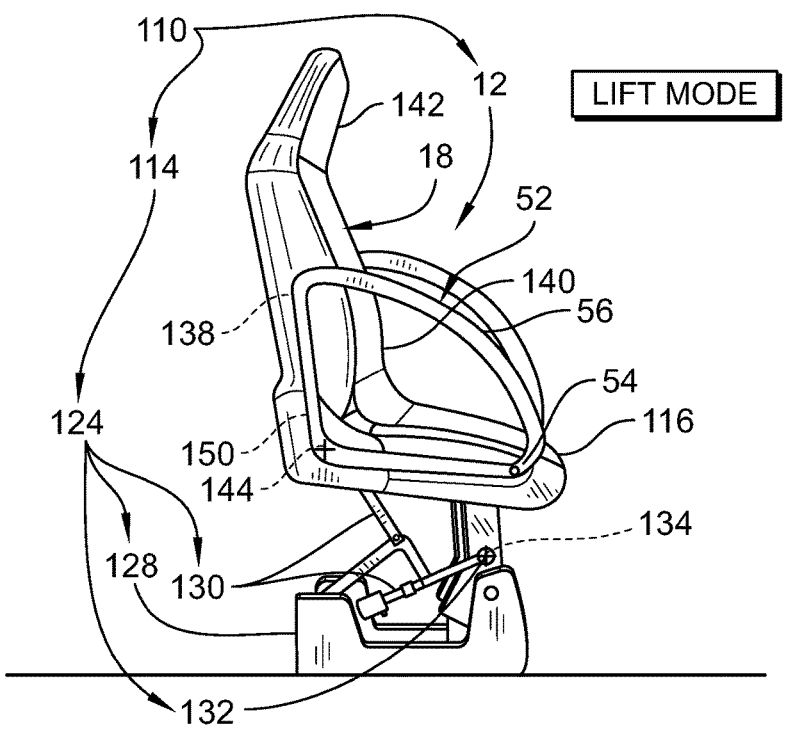
FIG. 4 is a view similar to FIG. 3 showing the lift system changed to the lift mode.
Figure 5:
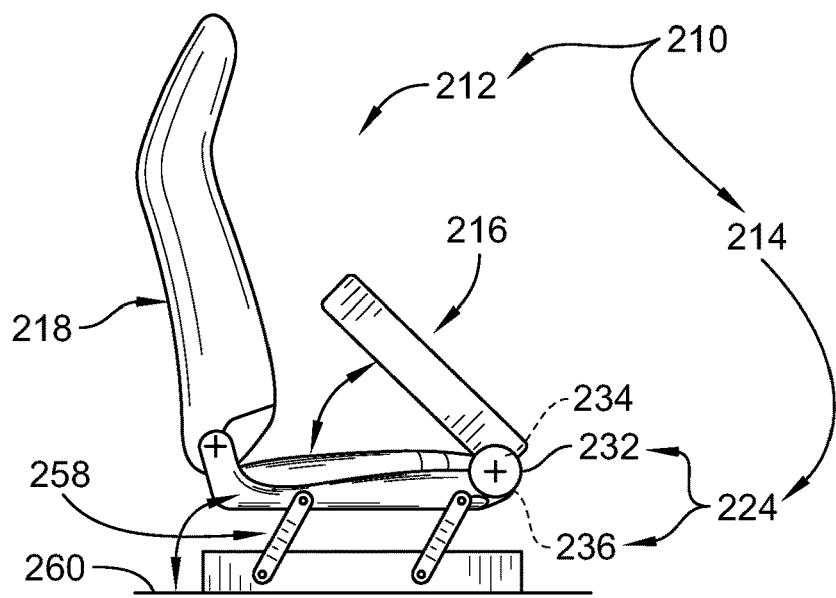
FIG. 5 is an elevation view of a third embodiment of an occupant support showing that the occupant support includes a seat back, a seat bottom, and a lift system coupled to the seat bottom and seat back and configured to change between a seat mode shown in FIG. 5 and a lift mode as suggested in FIG. 6.

A first embodiment of an occupant support 10 is shown in FIGS. 1 and 2. The occupant support 10 includes a vehicle seat 12 and a lift system 14 configured to change between a seat mode as suggested in FIG. 1 and a lift mode as suggested in FIG. 2. A second embodiment of an occupant support 110 is shown in FIGS. 3 and 4. A third embodiment of an occupant support 210 is shown in FIG. 5. A fourth embodiment of an occupant support 310 is shown in FIG. 6. A fifth embodiment of an occupant support is shown in FIG. 7.

An occupant support 10 is shown in FIGS. 1 and 2. The occupant support 10 includes a vehicle seat 12 and a lift system 14 as shown in FIGS. 1 and 2. The vehicle seat 12 includes a seat bottom 16 and a seat back 18. The seat back 18 is coupled to the seat bottom 16. The lift system 14 is coupled to the seat bottom 16 and seat back 18 and is configured to change between a seat mode as shown in FIG. 1 and a lift mode as shown in FIG. 2. The lift system 14 is in the seat mode when the seat bottom 16 is in a generally horizontal position and the seat back 18 is arranged to extend upwardly away from the seat bottom 16. The seat bottom 16 and seat back 18 cooperate to support an occupant sitting on the vehicle seat 12 when the lift system 14 is in the seat mode. The lift system 14 is in the lift mode when the seat bottom 16 moves to an inclined position so as to aid an occupant when the occupant is entering or exiting the vehicle seat 12.

The lift system 14 includes a power supply 20, a control unit 22, and a lift mechanism 24 as show in FIG. 1. The power supply 20 is coupled to the vehicle seat 12. The control unit 22 is coupled to the power supply 20 and is configured to provide a command in response to receiving an input 26. The lift mechanism 24 is coupled to the control unit 22 and the power supply 20 to receive power selectively from the power supply 20 in response to the command from the control unit 22.

The lift mechanism 24 includes a base 28, a lift unit 30, and a lift pivot 32 as shown in FIGS. 1 and 2. The lift unit 30 is arranged to extend between and interconnect the seat bottom 16 and the base 28. The lift unit 30 is configured to move between a retracted configuration as shown in FIG. 1 and an extended configuration as shown in FIG. 2. The lift unit 30 is in the retracted configuration when the lift system 14 is in the seat mode and the lift unit 30 is in the extended configuration when the lift system 14 is in the lift mode. The lift pivot 32 is arranged to extend between and interconnect the base 28 and the seat bottom 16 to cause the seat bottom 16 to rotate about a pivot axis 34 when the lift unit 30 moves between the retracted and extended configurations.

The lift mechanism 24 further includes an actuator 36 as shown in FIG. 1. The actuator 36 is coupled to the lift unit 30 to cause the lift unit 30 to move between the extended and retracted configurations in response to receiving power from the power supply 20. In some examples, the lift unit 30 may be a four-bar linkage in a rhombus shape as shown in FIGS. 1 and 2. In one example, the actuator is a linear actuator. In another example, the actuator is a hydraulic actuator. However, any suitable actuator may be used.

The power supply 20, in one example, is the supply of power provided by the vehicle. In another example, the power supply 20 is a battery coupled to the vehicle seat.

The input 26, in one example, could be a button or a switch coupled to the vehicle seat to cause power to be selectively supplied to the lift system to change the lift system between the seat mode and the lift mode. In another example, the input may be a remote device. In another example, the input may be a manual input such as a lever.

In some examples, the seat back 18 includes a seat-back frame 38, a backrest 40, and a headrest 42 as shown in FIGS. 1 and 2. The seat-back frame 38 is coupled to the base 28 to pivot about a lateral axis 44 relative to the base 28. The lateral axis 44 is located in a fixed position relative to the base 28. The backrest 40 is coupled to the seat-back frame 38. The headrest 42 is coupled to the seat-back frame 38 to locate the backrest 40 between the seat bottom 16 and the headrest 42 when the lift system 14 is in the seat mode. In some examples, the lift system 14 is also in the lift mode when the seat bottom 16 is separated and in a spaced-apart relation to the seat back 18.

In some examples, the backrest 40 includes a lower-back support 46, an upper-back support 48, and a recline unit 50 as shown in FIGS. 1 and 2. The lower-back support 46 is coupled to the seat bottom 16 to move therewith. The upper-back support 48 is coupled to the seat-back frame 38 in a fixed position relative to the seat-back frame 38. The recline unit 50 is arranged to extend between and interconnect the seat back 18 and the base 28 to allow the seat back 18 to rotate about the lateral axis 44 relative to the base 28.

The vehicle seat 12 may further include an arm rest 52. The arm rest 52 is coupled to the seat bottom 16 to extend from the seat bottom 16 toward the seat back 18 when the lift system 14 is in the seat mode.

In another example, the arm rest 52 includes an armrest-mount 54 and an arm support 56 as shown in FIGS. 1 and 2. The armrest-mount 54 is coupled to the seat bottom 16 in a fixed position relative to the seat bottom 16. The arm support 56 is coupled to the armrest-mount 54 and is configured to move relative to the armrest-mount 54 between a flat position as shown in FIG. 1 and an upright position as shown in FIG. 2. The arm rest 52 is in the flat position when the arm support 56 extends in a rearward direction away from the seat bottom 16 toward the seat back 18 when the lift system 14 is in the seat mode. The arm rest 52 is in the upright position in which the arm support 56 extends in an upward direction away from the seat bottom 16 and the seat back 18.

An occupant support 110 is shown in FIGS. 3 and 4. The occupant support 110 includes a vehicle seat 112 and a lift system 114 as shown in FIGS. 3 and 4. The vehicle seat 112 includes a seat bottom 116 and a seat back 118. The seat back 118 is coupled to the seat bottom 116. The lift system 114 is coupled to the seat bottom 116 and seat back 118 and is configured to a seat mode as shown in FIG. 3 and a lift mode as shown in FIG. 4. In some examples, the seat back 118 is coupled to the seat bottom 116 to move with the seat bottom 116 as the lift system 114 changes between the seat mode and the lift mode as shown in FIGS. 3 and 4.

The lift system 114 includes a power supply 20, a control unit 22, and a lift mechanism 124 as show in FIG. 3. The power supply 20 is coupled to the vehicle seat 112. The control unit 22 is coupled to the power supply 20 and is configured to provide a command in response to receiving an input 26. The lift mechanism 124 is coupled to the control unit 22 and the power supply 20 to receive power selectively from the power supply 20 in response to the command from the control unit 22.

The lift mechanism 124 includes a base 128, a lift unit 130, and a lift pivot 132 as shown in FIGS. 3 and 4. The lift unit 130 is arranged to extend between and interconnect the seat bottom 116 and the base 128. The lift unit 130 is configured to move between a retracted configuration as shown in FIG. 3 and an extended configuration as shown in FIG. 4. The lift pivot 132 is arranged to extend between and interconnect the base 128 and the seat bottom 116 to cause the seat bottom 116 to rotate about a pivot axis 134 when the lift unit 130 moves between the retracted and extended configurations. In some examples, the lift unit 130 may be a two-bar linkage.

The lift mechanism 124 may further includes an actuator 136 as shown in FIG. 3. The actuator 136 is coupled to the lift unit 130 to cause the lift unit 130 to move between the extended and retracted configurations in response to receiving power from the power supply 20.

The seat back 118 includes a seat-back frame 138, a backrest 140, and a headrest 142 as shown in FIGS. 3 and 4. The seat-back frame 138 is coupled to the seat bottom 116 to pivot about a lateral axis 144 relative to the seat bottom 116. The lateral axis 144 is located in a fixed position relative to the seat bottom 116. The backrest 140 is coupled to the seat-back frame 138. The headrest 142 is coupled to the backrest 140 and the seat-back frame 138.

The seat back 118 further includes a recline unit 150. The recline unit 150 is arranged to extend between and interconnect the seat-back frame 138 and the seat bottom 116 to allow the seat back 118 to rotate about the lateral axis 144 relative to the seat bottom 116.

The vehicle seat 112 may further include an arm rest 152. The arm rest 152 is coupled to the seat bottom 116 to extend from the seat bottom 116 toward the seat back 118 when the lift system 114 is in the seat mode.

An occupant support 210 is shown in FIG. 5. The occupant support 210 includes a vehicle seat 212 and a lift system 214. The vehicle seat 212 includes a seat bottom 216 and a seat back 218. The seat back 218 is coupled to the seat bottom 216. The lift system 214 is coupled to the seat bottom 216 and seat back 218 and is configured to a seat mode similar to the seat mode shown in FIG. 3 and a lift mode as shown in FIG. 5. to aid an occupant when the occupant is entering or existing the vehicle seat 12.

The lift system 214 includes a power supply 20, a control unit 22, and a lift mechanism 224 as show in FIG. 5. The power supply 20 is coupled to the vehicle seat 212. The control unit 22 is coupled to the power supply 20 and is configured to provide a command in response to receiving an input 26. The lift mechanism 224 is coupled to the control unit 22 and the power supply 20 to receive power selectively from the power supply 20 in response to the command from the control unit 22.

The vehicle seat 212 further includes a seat foundation 258 as shown in FIG. 5. The seat foundation 258 is arranged to extend between and interconnect the seat bottom 216 to a floor of a vehicle 260 to cause the seat bottom 216 and seat back 218 to move back and forth and up and down relative to the floor of the vehicle 260. The movements of the vehicle seat 212 provided by the seat foundation 258 are used to provide for comfort of the occupant while the occupant is seated on the vehicle seat. While the seat foundation 258 may be used to lift the vehicle seat 212 and provide an incline to seat bottom 216, the seat foundation 258 does not place the seat bottom 216 in the inclined position associated with the lift system 214 being in the lift mode.

The lift mechanism 224 includes a lift pivot unit 232 and an actuator 236 as shown in FIG. 5. The lift pivot unit 232 is arranged to extend between and interconnect the seat bottom 216 and the seat foundation 258. The lift pivot unit 232 is configured to cause the seat bottom 216 to rotate about a pivot axis 234 relative to the seat back 218 and the seat foundation 258 between a raised position as shown in FIG. 5 and a lowered position. The raised position is associated with the lift mode and the lowered position is associated with the seat mode. The actuator 236 is coupled to the lift pivot unit 232 to cause the lift pivot unit 232 to move between the raised and lowered positions in response to receiving power from the power supply 20.

In some examples, the actuator 236 may be an electric motor coupled to the seat bottom. In another example, the actuator 236 may be an electric motor coupled to a transmission. However, any suitable actuator may be used. Reference is hereby made to U.S. Provisional application Ser. No. 16/021,778 filed Jun. 28, 2018 and entitled LEG SUPPORT FOR VEHICLE SEAT for disclosure relating to use of actuators, which application is hereby incorporated in its entirety herein.

An occupant support 310 is shown in FIG. 6. The occupant support 310 includes a vehicle seat 312 and a lift system 314. The vehicle seat 312 includes a seat bottom 316 and a seat back 318. The seat back 318 is coupled to the seat bottom 316. The lift system 314 is coupled to the seat bottom 316 and seat back 318 and is configured to a seat mode similar to the seat mode as shown in FIG. 3 and a lift mode as shown in FIG. 6. In some examples, the seat back 318 is coupled to the seat bottom 316 to move with the seat bottom 316 as the lift system 314 changes between the seat mode and the lift mode.

The lift system 314 includes a power supply 20, a control unit 22, and a lift mechanism 324 as show in FIG. 6. The power supply 20 is coupled to the vehicle seat 312. The control unit 22 is coupled to the power supply 20 and is configured to provide a command in response to receiving an input 26. The lift mechanism 324 is coupled to the control unit 22 and the power supply 20 to receive power selectively from the power supply 20 in response to the command from the control unit 22.

The lift mechanism 324 includes a base 328, a lift unit 330, and a lift pivot 332 as shown in FIG. 6. The lift unit 330 is arranged to extend between and interconnect the seat bottom 316 and the base 328. The lift unit 330 is configured to move between a retracted configuration similar to the retracted configuration as shown in FIG. 3 and an extended configuration as shown in FIG. 6. The lift pivot 332 is arranged to extend between and interconnect the base 328 and the seat bottom 316 to cause the seat bottom 316 to rotate about a pivot axis 334 when the lift unit 330 moves between the retracted and extended configurations. In some examples, the lift unit 330 may include four or more linkages.

The lift mechanism 324 may further include an actuator 336 as shown in FIG. 6. The actuator 336 is coupled to the lift unit 330 to cause the lift unit 330 to move between the extended and retracted configurations in response to receiving power from the power supply 20.

The seat back 318 includes a seat-back frame 338, a backrest 340, and a headrest 342 as shown in FIG. 6. The seat-back frame 338 is coupled to the seat bottom 316 to pivot about a lateral axis 344 relative to the seat bottom 316. The lateral axis 344 is located in a fixed position relative to the seat bottom 316. The backrest 340 is coupled to the seat-back frame 338. The headrest 342 is coupled to the backrest 340 and the seat-back frame 338.

The backrest 340 includes a recline unit 350. The recline unit 350 is arranged to extend between and interconnect the seat back 118 and the seat bottom 316 to allow the seat back 318 to rotate about the lateral axis 344 relative to the seat bottom 316.

The vehicle seat may further include an arm rest. The arm rest is coupled to the seal bottom to extend from the seat bottom toward the seat back when the lift system is in the seat mode.

An occupant support 410 is shown in FIG. 7. The occupant support 410 includes a vehicle seat 412 and a lift system 414. The vehicle seat 412 includes a seat bottom 416 and a seat back 418. The seat back 418 is coupled to the seat bottom 416. The lift system 414 is coupled to the seat bottom 416 and seat back 418 and is configured to a seat mode similar to the seat mode as shown in FIG. 1 and a lift mode as shown in FIG. 7.

The lift system 414 includes a power supply 20, a control unit 22, and a lift mechanism 424 as show in FIG. 1. The power supply 20 is coupled to the vehicle seat 12. The control unit 22 is coupled to the power supply 20 and is configured to provide a command in response to receiving an input 26. The lift mechanism 424 is coupled to the control unit 22 and the power supply 20 to receive power selectively from the power supply 20 in response to the command from the control unit 22.

The vehicle seat 412 further includes a seat foundation 458 as shown in FIG. 7. The seat foundation 458 is coupled to the seat bottom 416 to cause the seat bottom 416 and seat back 418 to move back and forth and up and down relative to a floor of the vehicle 460.

The lift mechanism 424 includes a base 428, a lift pivot unit 432, and an actuator 436 as shown in FIG. 7. The lift pivot unit 432 is arranged to extend between and interconnect the seat foundation 458 and the base 428 to cause the seat back 418, the seat bottom 416, and the seat foundation 458 to rotate about a pivot axis 434 relative the base 428 between a raised position associated with the lift mode and a lowered position associated with the seat mode. The actuator 436 is coupled to the lift pivot unit 432 to cause the lift pivot unit 432 to move between the raised and lowered positions in response to receiving power from the power supply 20.

The seat back 418 includes a seat-back frame 438, a backrest 440, and a headrest 442. The seat-back frame 438 is coupled to the seat bottom 416 to pivot about a lateral axis 444 relative to the seat bottom 416. The lateral axis 444 is located in a fixed position relative to the seat bottom 416. The backrest 440 is coupled to the seat-back frame 438. The headrest 442 is coupled to the backrest 440 and the seat-back frame 438.

The following numbered clauses include embodiments that are contemplated and non-limiting:

Clause 1. An occupant support comprising a vehicle seat including a seat bottom and a seat back coupled to the seat bottom.

Clause 2. The occupant support of clause 1, any other clause, or combination of clauses, further comprising a lift system coupled to the seat bottom and seat back and configured to change between a seat mode in which the seat bottom is in a generally horizontal position and the seat back is arranged to extend upwardly away from the seat bottom and the seat bottom and seat back cooperate to support an occupant sitting on the vehicle seat and a lift mode in which the seat bottom moves to an inclined position to aid an occupant when the occupant is entering or existing the vehicle seat.

Clause 3. The occupant support of clause 2, any other clause, or combination of clauses, wherein the lift system includes a power supply.

Clause 4. The occupant support of clause 3, any other clause, or combination of clauses, wherein the lift system further includes a control unit coupled to the power supply.

Clause 5. The occupant support of clause 4, any other clause, or combination of clauses, wherein the lift system further includes a lift mechanism coupled to the control unit and the power supply to receive power selectively from the power supply in response to a command from the control unit, and the control unit is configured to provide the command in response to receiving an input.

Clause 6. The occupant support of clause 5, any other clause, or combination of clauses, wherein the lift mechanism includes a base.

Clause 7. The occupant support of clause 6, any other clause, or combination of clauses, wherein the lift mechanism further includes a lift unit arranged to extend between and interconnect the seat bottom and the base and configured to move between a retracted configuration when the lift system is in the seat mode and an extended configuration when the lift system in sin the lift mode.

Clause 8. The occupant support of clause 7, any other clause, or combination of clauses, wherein the lift mechanism further includes a lift pivot arranged to extend between and interconnect the base and the seat bottom to cause the seat bottom to rotate about a pivot axis when the lift unit moves between the retracted and extended configurations.

Clause 9. The occupant support of clause 8, any other clause, or combination of clauses, wherein the lift mechanism further includes an actuator coupled to the lift unit to cause the lift unit to move between the extended and retracted configurations in response to receiving power from the power supply.

Clause 10. The occupant support of clause 9, any other clause, or combination of clauses, wherein the seat back includes a seat-back frame coupled to the base to pivot about a lateral axis relative to the base and the lateral axis is located in a fixed position relative to the base.

Clause 11. The occupant support of clause 10, any other clause, or combination of clauses, wherein the seat back further includes a backrest coupled to the seat-back frame and a headrest coupled to the seat-back frame to locate the backrest between the seat bottom and the headrest when the lift system is in the seat mode.

Clause 12. The occupant support of clause 11, any other clause, or combination of clauses, wherein the backrest includes a lower-back support coupled to the seat bottom to move therewith, an upper-back support coupled to the seat-back frame in a fixed position relative to the seat-back frame, and a recline unit arranged to extend between and interconnect the seat back and the base to allow the seat back to rotate about the lateral axis relative to the base.

Clause 13. The occupant support of clause 12, any other clause, or combination of clauses, wherein the lift unit is a four-bar linkage in a rhombus shape.

Clause 14. The occupant support of clause 11, any other clause, or combination of clauses, wherein the lift system is in the lift mode when the seat bottom is separated and located in a spaced-apart relation to the seat back Clause 15. The occupant support of clause 5, any other clause, or combination of clauses, wherein the vehicle seat further includes a seat foundation arranged to extend between and interconnect the seat bottom to a floor of a vehicle to cause the seat bottom and seat back to move back and forth and up and down relative to the floor of the vehicle.

Clause 16. The occupant support of clause 15, any other clause, or combination of clauses, wherein the lift mechanism includes a lift pivot unit arranged to extend between and interconnect the seat bottom and the seat foundation to cause the seat bottom to rotate about a pivot axis relative to the seat back and the seat foundation between a raised position associated with the lift mode and a lowered position associated with the seat mode Clause 17. The occupant support of clause 16, any other clause, or combination of clauses, wherein the lift mechanism further includes an actuator coupled to the lift pivot unit to cause the lift pivot unit to move between the raised and lowered positions in response to receiving power from the power supply.

Clause 18. The occupant support of clause 2, any other clause, or combination of clauses, wherein the vehicle seat further includes an arm rest coupled to the seat bottom to extend from the seat bottom toward the seat back when the lift system is in the seat mode.

Clause 19. The occupant support of clause 18, any other clause, or combination of clauses, wherein the arm rest includes an armrest-mount coupled to the seat bottom in a fixed position relative to the seat bottom Clause 20. The occupant support of clause 19, any other clause, or combination of clauses, wherein the arm rest further includes an arm support coupled to the armrest mount and configured to move relative to the armrest mount between a flat position in which the arm support extends in a rearward direction away from the seat bottom toward the seat back when the lift system is in the seat mode and an upright position in which the arm support extends in an upward direction away from the seat bottom and the seat back.

Clause 21. The occupant support of clause 5, any other clause, or combination of clauses, wherein the vehicle seat further includes a seat foundation coupled to the seat bottom to cause the seat bottom and seat back to move back and forth and up and down relative to a floor of the vehicle.

Clause 22. The occupant support of clause 21, any other clause, or combination of clauses, wherein the lift mechanism includes a base and a lift pivot unit arranged to extend between and interconnect the seat foundation and the base to cause the seat back, the seat bottom, and the seat foundation to rotate about a pivot axis relative the base between a raised position associated with the lift mode and a lowered position associated with the seat mode and an actuator coupled to the lift pivot unit to cause the lift pivot unit to move between the raised and lowered positions in response to receiving power from the power supply.

Clause 23. The occupant support of clause 22, any other clause, or combination of clauses, wherein the seat back includes a seat-back frame coupled to the seat bottom to pivot about a lateral axis relative to the seat bottom and the lateral axis is located in a fixed position relative to the seat bottom.

Clause 24. The occupant support of clause 23, any other clause, or combination of clauses, wherein the seat back further includes a backrest coupled to the seat-back frame, a headrest coupled to the backrest and the seatback frame.

Clause 25. The occupant support of clause 8, any other clause, or combination of clauses, wherein the seat back is coupled to the seat bottom to move with the seat bottom as the lift system changes between the seat mode and the lift mode and the seat back includes a seat-back frame coupled to the seat bottom to pivot about a lateral axis relative to the seat bottom and the lateral axis is located in a fixed position relative to the seat bottom, a backrest coupled to the seat-back frame, and a headrest coupled to the backrest and the seatback frame.

Clause 26. The occupant support of clause 25, any other clause, or combination of clauses, wherein the backrest includes a recline unit arranged to extend between and interconnect the seat back and the seat bottom to allow the seat back to rotate about the lateral axis relative to the seat bottom.

Clause 27. The occupant support of clause 26, any other clause, or combination of clauses, wherein the lift unit is a two-bar linkage.

Clause 28. The occupant support of clause 26, any other clause, or combination of clauses, wherein the lift unit includes four or more linkages.

The invention claimed is:

1. An occupant support comprising
    a vehicle seat including a seat bottom and a seat back coupled to the seat bottom and
    a lift system coupled to the seat bottom and seat back and configured to change between a seat mode in which the seat bottom is in a generally horizontal position and the seat back is arranged to extend upwardly away from the seat bottom and the seat bottom and seat back cooperate to support an occupant sitting on the vehicle seat and a lift mode in which the seat bottom moves to an inclined position to aid an occupant when the occupant is entering or exiting the vehicle seat,
    wherein the lift system comprises a lift mechanism that includes a base, a lift unit arranged to extend between and interconnect the seat bottom and the base and configured to move between a retracted configuration when the lift system is in the seat mode and an extended configuration when the lift system is in the lift mode, a lift pivot arranged to extend between and interconnect the base and the seat bottom to cause the seat bottom to rotate about a pivot axis when the lift unit moves between the retracted and extended configurations and wherein the pivot axis is located in a fixed position relative to the base.

2. The occupant support of claim 1, wherein the lift system further includes a power supply and a control unit coupled to the power supply, and the lift mechanism is coupled to the control unit and the power supply to receive power selectively from the power supply in response to a command from the control unit, and the control unit is configured to provide the command in response to receiving an input.

3. The occupant support claim 2, wherein the lift mechanism further includes an actuator coupled to the lift unit to cause the lift unit to move between the extended and retracted configurations in response to receiving power from the power supply.

4. The occupant support of claim 3, wherein the seat back includes a seat-back frame coupled to the base to pivot about a lateral axis relative to the base and the lateral axis is located in a fixed position relative to the base, a backrest coupled to the seat-back frame, a headrest coupled to the seat-back frame to locate the backrest between the seat bottom and the headrest when the lift system is in the seat mode.

5. The occupant support of claim 4, wherein the backrest includes a lower-back support coupled to the seat bottom to move therewith, an upper-back support coupled to the seat-back frame in a fixed position relative to the seat-back frame, and a recline unit arranged to extend between and interconnect the seat back and the base to allow the seat back to rotate about the lateral axis relative to the base.

6. The occupant support of claim 5, wherein the lift unit is a four-bar linkage in a rhombus shape.

7. The occupant support of claim 4, wherein the lift system is in the lift mode when the seat bottom is separated and located in a spaced-apart relation to the seat back.

8. The occupant support of claim 1, wherein the vehicle seat further includes a seat foundation arranged to extend between and interconnect the seat bottom to a floor of a vehicle to cause the seat bottom and seat back to move back and forth and up and down relative to the floor of the vehicle.

9. The occupant support of claim 8, wherein the lift mechanism further includes an actuator coupled to the lift pivot unit to cause the lift pivot unit to move between the raised and lowered positions in response to receiving power from the power supply.

10. The occupant support of claim 1, wherein the vehicle seat further includes an arm rest coupled to the seat bottom to extend from the seat bottom toward the seat back when the lift system is in the seat mode.

11. The occupant support of claim 10, wherein the arm rest includes an armrest-mount coupled to the seat bottom in a fixed position relative to the seat bottom, an arm support coupled to the armrest mount and configured to move relative to the armrest mount between a flat position in which the arm support extends in a rearward direction away from the seat bottom toward the seat back when the lift system is in the seat mode and an upright position in which the arm support extends in an upward direction away from the seat bottom and the seat back.

12. The occupant support of claim 1, wherein the vehicle seat further includes a seat foundation coupled to the seat bottom to cause the seat bottom and seat back to move back and forth and up and down relative to a floor of the vehicle.

13. The occupant support of claim 1, wherein the seat back is coupled to the seat bottom to move with the seat bottom as the lift system changes between the seat mode and the lift mode and the seat back includes a seat-back frame coupled to the seat bottom to pivot about a lateral axis relative to the seat bottom and the lateral axis is located in a fixed position relative to the seat bottom, a backrest coupled to the seat-back frame, and a headrest coupled to the backrest and the seatback frame.

14. An occupant support comprising
a vehicle seat including a seat bottom and a seat back coupled to the seat bottom and
a lift system coupled to the seat bottom and seat back and configured to change between a seat mode in which the seat bottom is in a generally horizontal position and the seat back is arranged to extend upwardly away from the seat bottom and the seat bottom and seat back cooperate to support an occupant sitting on the vehicle seat and a lift mode in which the seat bottom moves to an inclined position to aid an occupant when the occupant is entering or existing the vehicle seat,
wherein the lift system further includes a power supply and a control unit coupled to the power supply, and the lift mechanism is coupled to the control unit and the power supply to receive power selectively from the power supply in response to a command from the control unit, and the control unit is configured to provide the command in response to receiving an input,
wherein the vehicle seat further includes a seat foundation coupled to the seat bottom to cause the seat bottom and seat back to move back and forth and up and down relative to a floor of the vehicle, and
wherein the lift mechanism includes a base and a lift pivot unit arranged to extend between and interconnect the seat foundation and the base to cause the seat back, the seat bottom, and the seat foundation to rotate about a pivot axis relative the base between a raised position associated with the lift mode and a lowered position associated with the seat mode and an actuator coupled to the lift pivot unit to cause the lift pivot unit to move between the raised and lowered positions in response to receiving power from the power supply.

15. The occupant support of claim 14, wherein the seat back includes a seat-back frame coupled to the seat bottom to pivot about a lateral axis relative to the seat bottom and the lateral axis is located in a fixed position relative to the seat bottom, a backrest coupled to the seat-back frame, a headrest coupled to the backrest and the seatback frame.

16. An occupant support comprising
a vehicle seat including a seat bottom and a seat back coupled to the seat bottom and
a lift system coupled to the seat bottom and seat back and configured to change between a seat mode in which the seat bottom is in a generally horizontal position and the seat back is arranged to extend upwardly away from the seat bottom and the seat bottom and seat back cooperate to support an occupant sitting on the vehicle seat and a lift mode in which the seat bottom moves to an inclined position to aid an occupant when the occupant is entering or existing the vehicle seat,
wherein the lift system further includes a power supply and a control unit coupled to the power supply, and the lift mechanism is coupled to the control unit and the power supply to receive power selectively from the power supply in response to a command from the control unit, and the control unit is configured to provide the command in response to receiving an input,
wherein the lift mechanism includes a base, a lift unit arranged to extend between and interconnect the seat bottom and the base and configured to move between a retracted configuration when the lift system is in the seat mode and an extended configuration when the lift system is in the lift mode, a lift pivot arranged to extend between and interconnect the base and the seat bottom to cause the seat bottom to rotate about a pivot axis when the lift unit moves between the retracted and extended configurations,
wherein the seat back is coupled to the seat bottom to move with the seat bottom as the lift system changes between the seat mode and the lift mode and the seat back includes a seat-back frame coupled to the seat bottom to pivot about a lateral axis relative to the seat bottom and the lateral axis is located in a fixed position relative to the seat bottom, a backrest coupled to the seat-back frame, and a headrest coupled to the backrest and the seatback frame, and
wherein the backrest includes a recline unit arranged to extend between and interconnect the seat back and the seat bottom to allow the seat back to rotate about the lateral axis relative to the seat bottom.

17. The occupant support of claim 16, wherein the lift unit is a two-bar linkage.

18. The occupant support of claim 16, wherein the lift unit includes four or more linkages.

* * * * *